United States Patent [19]
Peticolas

[11] Patent Number: 6,093,975
[45] Date of Patent: Jul. 25, 2000

[54] TURBOGENERATOR/MOTOR CONTROL WITH SYNCHRONOUS CONDENSER

[75] Inventor: Brian W. Peticolas, Redondo Beach, Calif.

[73] Assignee: Capstone Turbine Corporation, Woodland Hills, Calif.

[21] Appl. No.: 09/181,388

[22] Filed: Oct. 27, 1998

[51] Int. Cl.[7] ............. F01D 15/10; H02K 7/18; H02P 9/04
[52] U.S. Cl. .............. 290/52; 290/40 A; 290/40 B; 290/40 C; 290/40 D
[58] Field of Search .................. 290/40 A, 40 B, 290/40 C, 40 D, 52

[56] References Cited

U.S. PATENT DOCUMENTS

| | | | |
|---|---|---|---|
| Re. 30,589 | 4/1981 | Park | 60/652 |
| 3,663,948 | 5/1972 | Nagae et al. | 323/8 |
| 3,718,837 | 2/1973 | Yokota et al. | 290/2 |
| 3,930,367 | 1/1976 | Gasparoli | 60/39.18 |
| 4,017,790 | 4/1977 | Friedlander . | |
| 4,071,897 | 1/1978 | Groves, Jr. et al. | 364/494 |
| 4,087,711 | 5/1978 | Kirtley, Jr. et al. | 310/184 |
| 4,340,820 | 7/1982 | Meyer-Pitroff et al. | 290/40 R |
| 4,346,304 | 8/1982 | Tsunoda et al. | 290/52 |
| 4,349,744 | 9/1982 | Reuther et al. | 290/40 C |
| 4,450,363 | 5/1984 | Russell et al. | 290/40 C |
| 4,590,416 | 5/1986 | Porche et al. | 323/20 J |
| 4,680,691 | 7/1987 | Yoshino et al. | 363/51 |
| 4,684,875 | 8/1987 | Powell | 323/204 |
| 5,053,635 | 10/1991 | West | 307/67 |
| 5,166,597 | 11/1992 | Larsen et al. | 323/17 |
| 5,194,801 | 3/1993 | Rozman | 322/28 |
| 5,262,677 | 11/1993 | Ramirez | 307/105 |
| 5,420,782 | 5/1995 | Luce et al. | 363/109 |
| 5,436,507 | 7/1995 | Brown et al. | 290/52 |
| 5,610,500 | 3/1997 | Giberson | 322/100 |
| 5,610,834 | 3/1997 | Schlueter | 322/429 |
| 5,635,773 | 6/1997 | Stuart | 307/366 |

Primary Examiner—Elvin Enad
Attorney, Agent, or Firm—Albert J. Miller

[57] ABSTRACT

A turbogenerator/motor controller with a microprocessor-based control system having a synchronous condenser, line commutated inverter, and a battery coupled to the turbogenerator/motor controller. When a load transient occurs, the gas turbine engine and the synchronous condenser, which draws its power from the line commutated inverter and battery, provide the power required to successfully meet the transient until the gas turbine engine controls respond by commanding the gas turbine engine to a higher speed, producing more power out of the turbogenerator. In the event of a sudden reduction in load, an auxiliary load device temporarily draws load until the gas turbine engine controls can respond and reduce the output power of the turbogenerator.

20 Claims, 7 Drawing Sheets

TURBOGENERATOR/MOTOR CONTROL WITH SYNCHRONOUS CONDENSER

TECHNICAL FIELD

This invention relates to the general field of turbogenerator/motor controls and more particularly to an improved turbogenerator/motor control system including a synchronous condenser.

BACKGROUND OF THE INVENTION

A permanent magnet generator/motor generally includes a rotor assembly having a plurality of equally spaced magnet poles of alternating polarity around the outer periphery of the rotor or, in more recent times, a solid structure of samarium cobalt or neodymium-iron-boron. The rotor is rotatable within a fixed stator which generally includes a plurality of windings or coils and magnetic poles of alternating polarity. In a generator mode, rotation of the rotor causes the permanent magnets to pass by the stator poles and coils and thereby induces an electric current to flow in each of the coils. Alternately, if an electric current is passed through the fixed stator coils, the energized coils will cause the rotor to rotate and thus the generator will perform as a motor.

As high-energy product permanent magnets with significant energy increases have become available at reduced prices, the utilization of the permanent magnet generator/motors has increased. The use of such high-energy product permanent magnets permits increasingly smaller machines capable of supplying increasingly higher power outputs.

One of the applications of a permanent magnet generator/motor is referred to as a turbogenerator which includes a power head mounted on the same shaft as the permanent magnet generator/motor, and also includes a combustor and recuperator. The turbogenerator power head would normally include a compressor, a gas turbine and a bearing rotor through which the permanent magnet generator/motor tie rod passes. The compressor is driven by the gas turbine which receives heated exhaust gases from the combustor supplied with preheated air from the recuperator.

A permanent magnet turbogenerator/motor can be utilized to provide electrical power for a wide range of utility, commercial and industrial applications. While an individual permanent magnet turbogenerator may only generate 24 to 50 kilowatts, powerplants of up to 500 kilowatts or greater are possible by linking numerous permanent magnet turbogenerator/motors together. Standby power, peak load shaving power and remote location power are just several of the potential utility applications which these lightweight, low noise, low cost, environmentally friendly, and thermally efficient units can be useful for. To meet the stringent utility requirements, particularly when the permanent magnet turbogenerator/motor is to operate as a supplement to utility power, precise control of the permanent magnet turbogenerator/motor is required.

In order to start the turbogenerator, electric current is supplied to the stator coils of the permanent magnet generator/motor to operate the permanent magnet generator/motor as a motor and thus to accelerate the gas turbine of the turbogenerator. During this acceleration, spark and fuel are introduced in the correct sequence to the combustor and self-sustaining gas turbine conditions are reached.

At this point, the inverter is disconnected from the permanent magnet generator/motor, reconfigured to a controlled 50–60 hertz mode, and then either supplies regulated 50–60 hertz three phase voltage to a stand alone load or phase locks to the utility, or to other like controllers, to operate as a supplement to the utility. In this mode of operation, the power for the inverter is derived from the permanent magnet generator/motor via high frequency rectifier bridges. A microprocessor can monitor turbine conditions and control fuel flow to the gas turbine combustor.

Alternately, a turbogenerator control system can utilize a high frequency inverter synchronously connected to the permanent magnet motor/generator of a turbogenerator, a low frequency load inverter, a direct current bus electrically connecting the two (2) inverters, and a central processing unit which controls the frequency and voltage/current of each of the inverters.

A gas turbine, however, inherently is an extremely limited thermal machine from a standpoint of its ability to change rapidly from one load state to a different load state. In terms of accepting an increased loading, small gas turbines have a limited capability of adding probably two (2) kilowatts per second; in other words, being able to accept full load in a fifteen (15) second period. The reality for stand-alone systems is that the application of load occurs in approximately one one-thousand of a second.

In terms of off-loading, the gas turbine has similar limitations if there is a rapid off-loading of power. When operating in a self-sustained manner, the gas turbine has a very large amount of stored energy, primarily stored in the form of heat in the associated recuperator. If the load were removed from the gas turbine, this stored energy would tend to overspeed the turbine.

One solution to these limitations of a gas turbine has been to provide energy storage devices such as batteries, ultracapacitors, or the like to the system, together with means to transfer the stored energy from these devices to the load.

SUMMARY OF THE INVENTION

The turbogenerator/motor controller of the present invention is a microprocessor-based control system having a synchronous condenser, a line commutated inverter, and a battery (or other form of energy storage) coupled to the turbogenerator/motor controller in order to provide for system load transients. When a load transient occurs, the gas turbine engine and the synchronous condenser, which draws its power from the line commutated inverter and battery, provide the power required to successfully meet the transient. The output power control regulates a constant AC voltage and any load placed on the output will immediately require more power to maintain the same level of AC voltage output. When this occurs, the output AC bus will immediately start to droop and the response to this droop is performed by the synchronous condenser controls which draw current out of the line commutated inverter and battery to regulate the AC output voltage. Simultaneously, the gas turbine engine controls respond by commanding the gas turbine engine to a higher speed, producing more power out of the turbogenerator. In the event of a sudden reduction in load, an auxiliary load device temporarily draws load until the gas turbine engine controls can respond and reduce the output power of the turbogenerator.

BRIEF DESCRIPTION OF THE DRAWINGS

Figure 1:
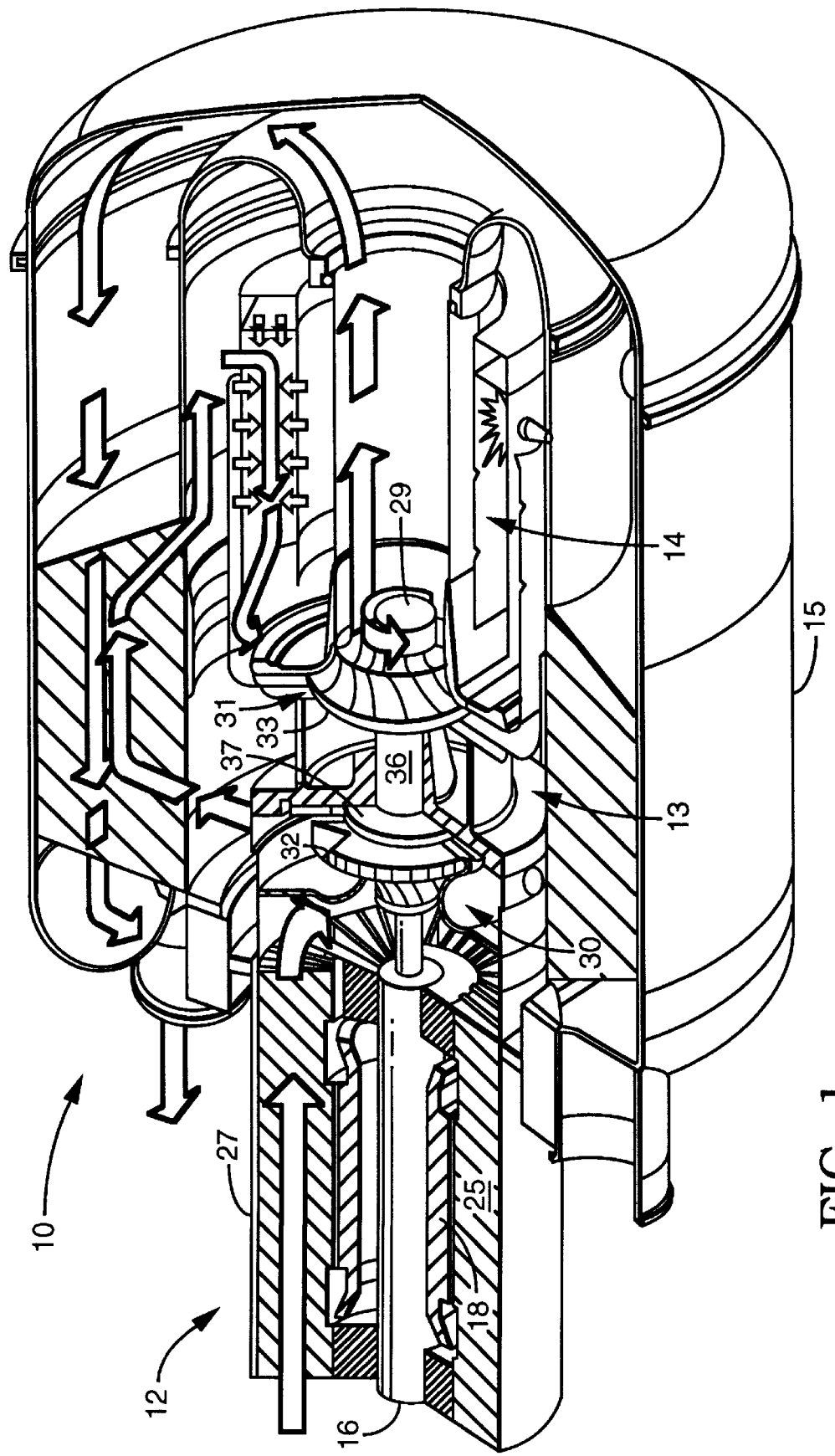
Figure 2:
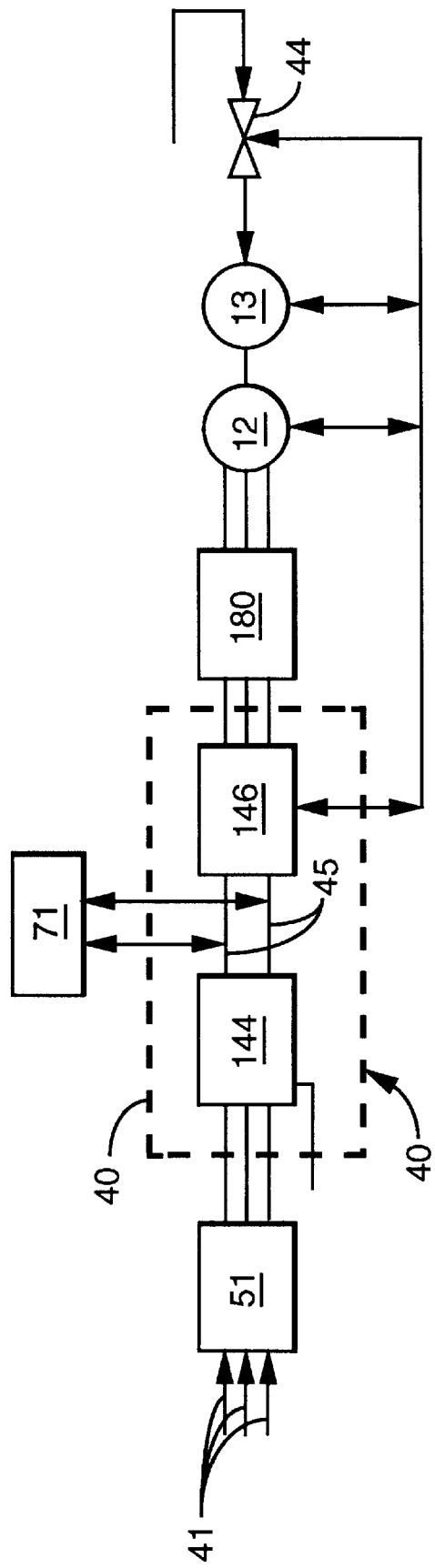
Figure 3:
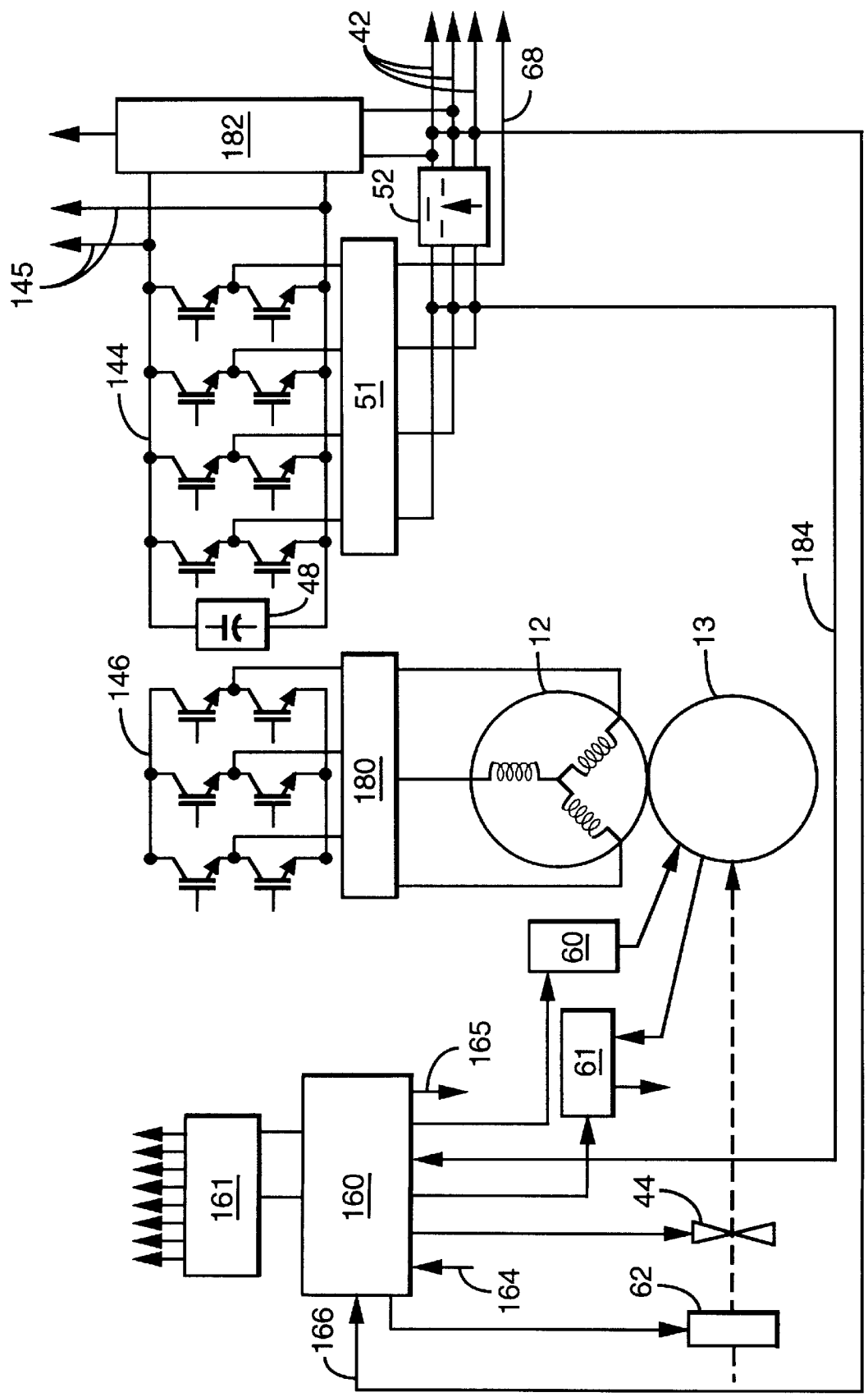
Figure 4:
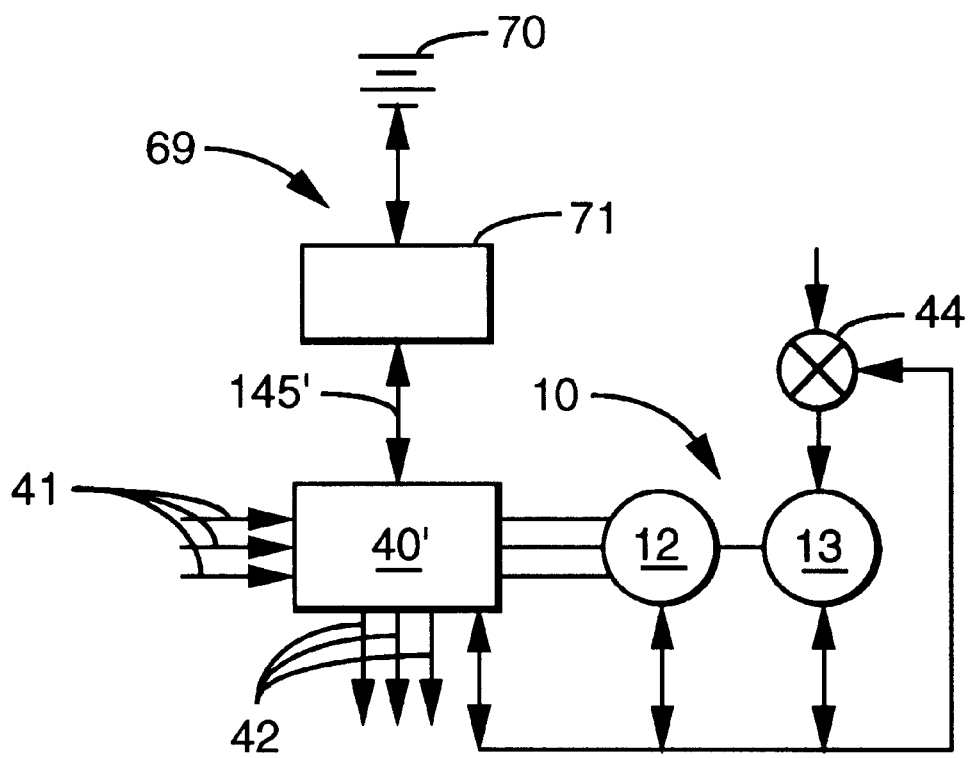
Figure 5:
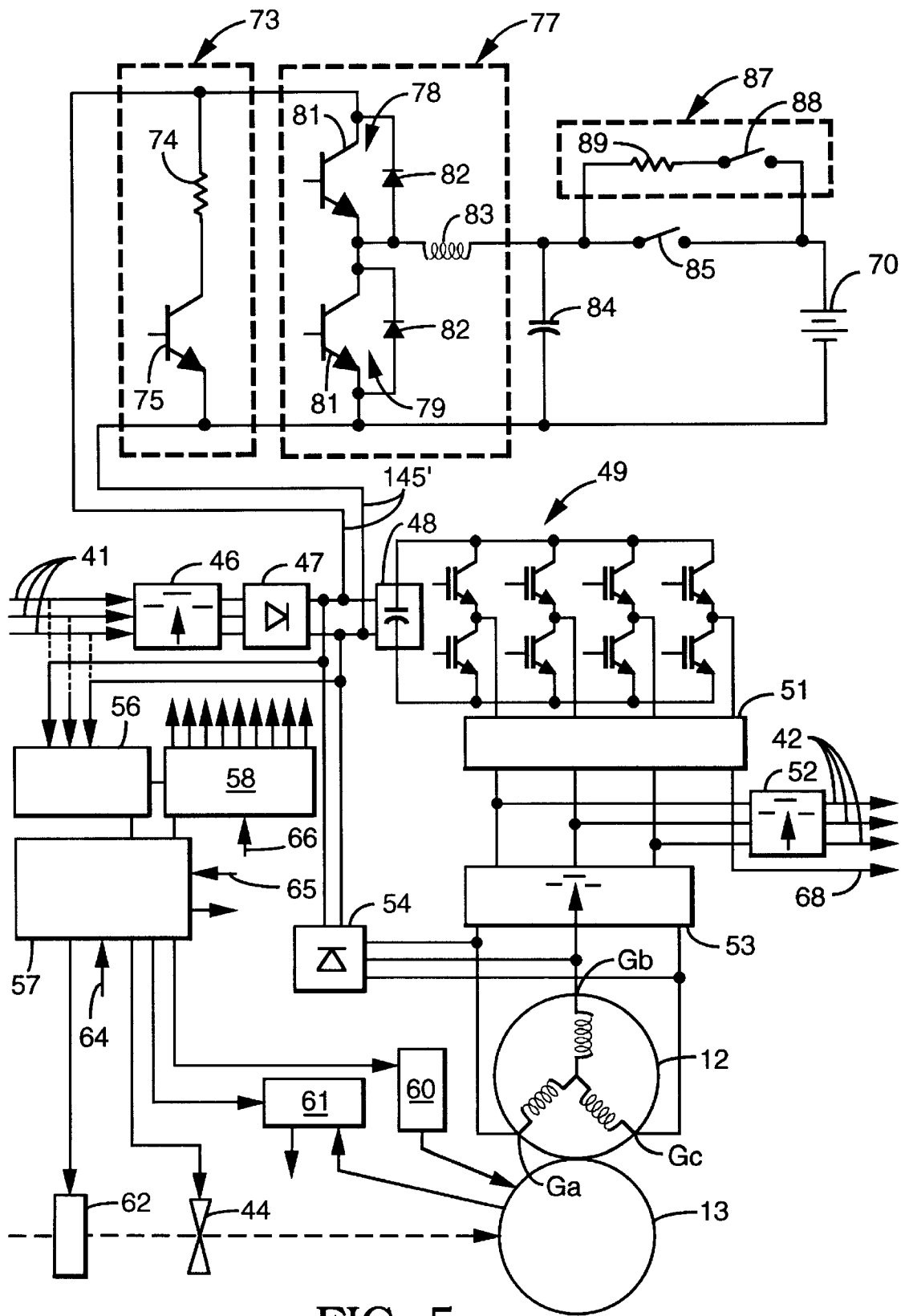
Figure 6:
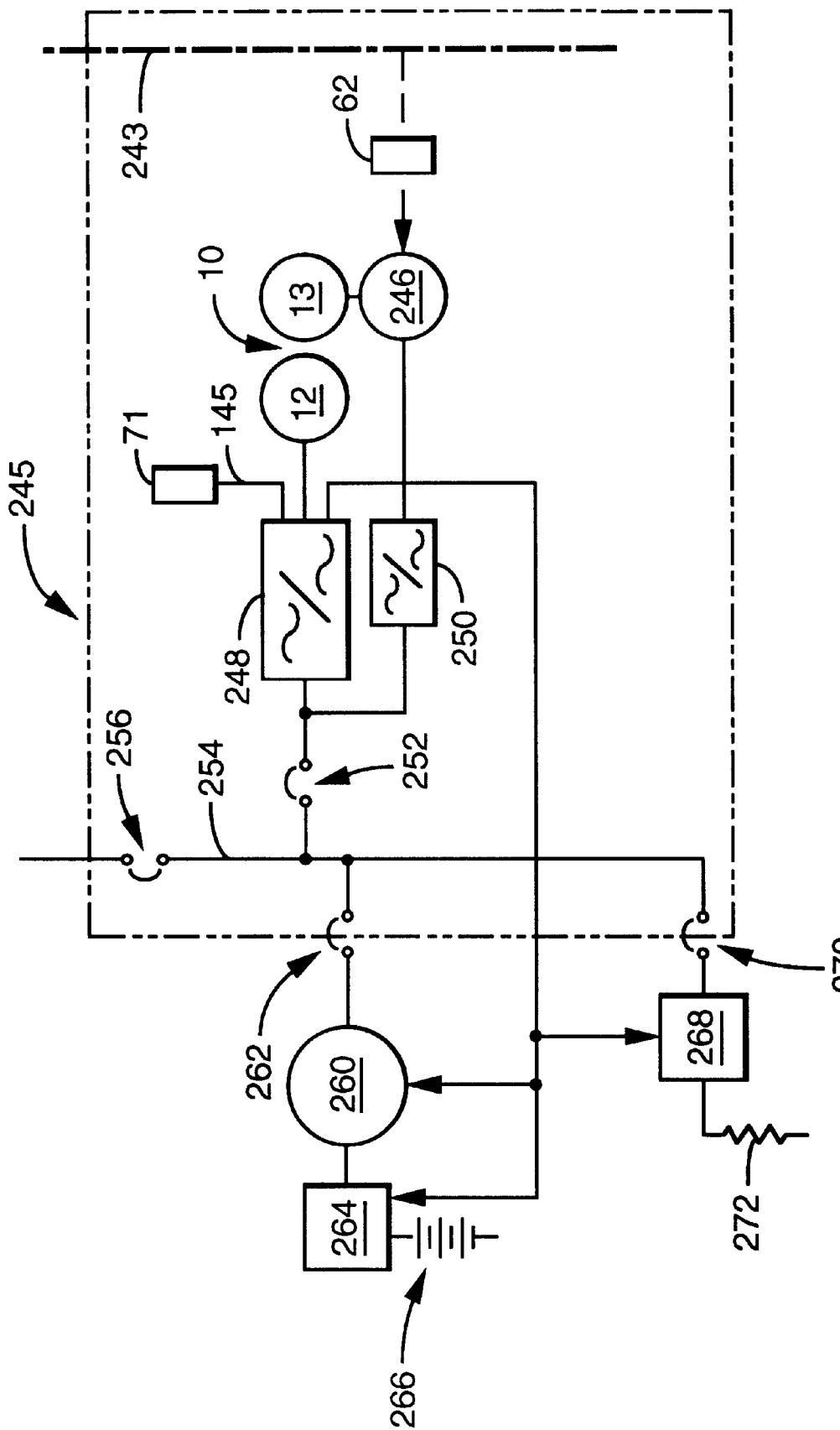
Figure 7:
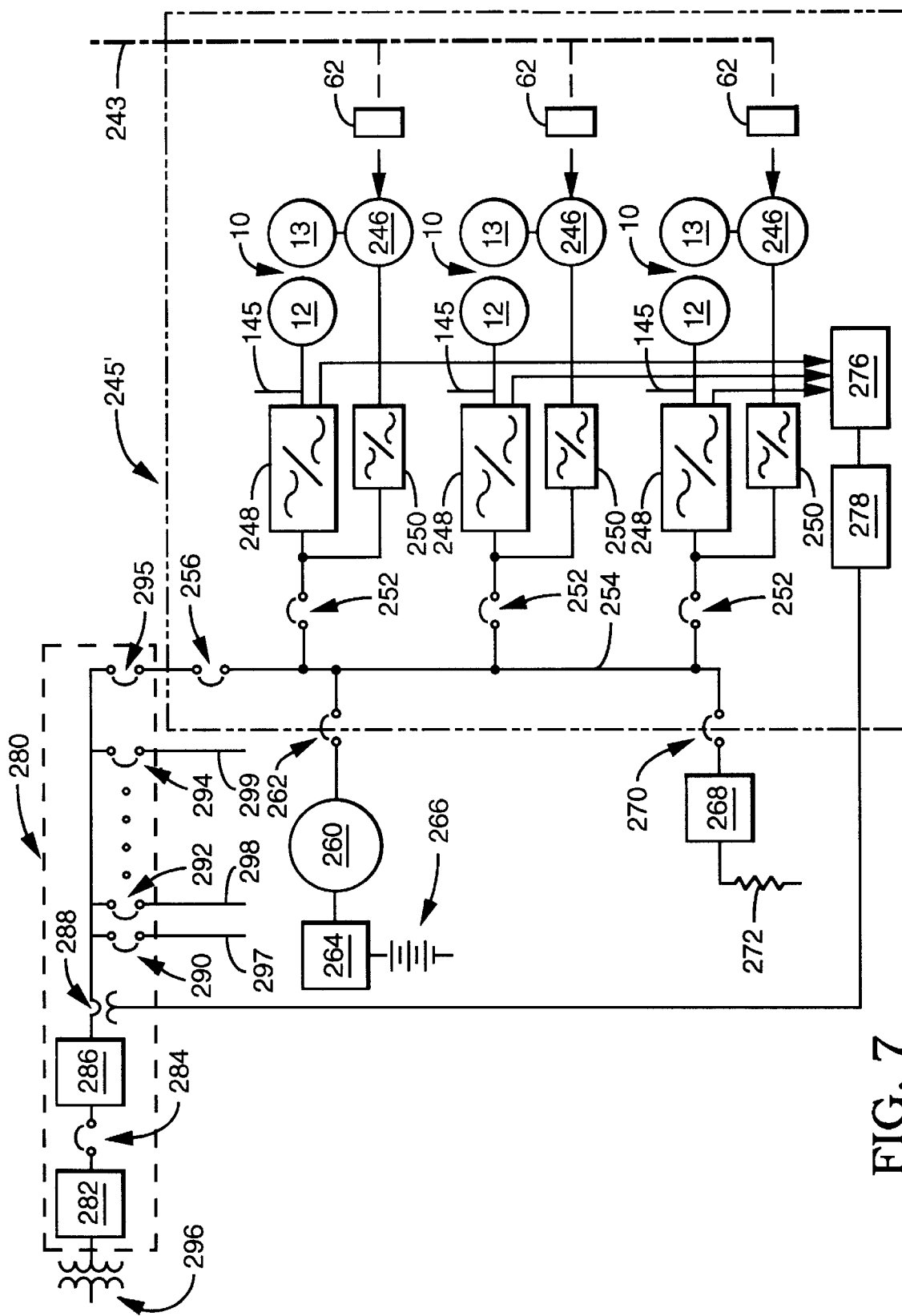

Having thus described the present invention in general terms, reference will now be made to the accompanying drawings in which:

FIG. 1 is a perspective view, partially cut away, of a permanent magnet turbogenerator/motor for use with the power control system of the present invention;

FIG. 2 is a functional block diagram of the interface between a turbogenerator/motor controller and the permanent magnet turbogenerator/motor illustrated in FIG. 1;

FIG. 3 is a functional block diagram of the permanent magnet turbogenerator/motor controller of FIG. 2;

FIG. 4 is a functional block diagram of the interface between an alternate turbogenerator/motor controller and the permanent magnet turbogenerator/motor illustrated in FIG. 1;

FIG. 5 is a functional block diagram of the permanent magnet turbogenerator/motor controller of FIG. 4;

FIG. 6 is a functional block diagram of the permanent magnet turbogenerator/motor synchronous condenser control system of the present invention for a single turbogenerator; and FIG. 7 is a functional block diagram of an alternate permanent magnet turbogenerator/motor synchronous condenser control system of the present invention for multiple turbogenerators and for a system operated in conjunction with a utility grid.

DETAILED DESCRIPTION OF THE PREFERRED EMBODIMENTS

A permanent magnet turbogenerator/motor 10 is illustrated in FIG. 1 as an example of a turbogenerator/motor for use in the power control system of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a permanent magnet motor stator 18 by a pair of spaced journal bearings. Radial stator cooling fins 25 are enclosed in an outer cylindrical sleeve 27 to form an annular air flow passage which cools the stator 18 and thereby preheats the air passing through on its way to the power head 13.

The power head 13 of the permanent magnet turbogenerator/motor 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet motor stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face at the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine wheel 33. The expanded turbine exhaust gases are then passed through the recuperator 15 before being discharged from the turbogenerator/motor 10.

The interface between the turbogenerator/motor controller 40 and the permanent magnet turbogenerator/motor 10 is illustrated in FIG. 2. The controller 40 generally comprises two bi-directional inverters connected by an internal DC bus 145, a load inverter 144 and a generator inverter 146. The controller 40 receives electrical power 41 from a source such as a utility through AC filter 51 or alternately from a battery through battery control electronics 71. The generator inverter 146 starts the turbine 31 of the power head 13 (using the permanent magnet generator as a motor) from either utility or battery power, and then the load inverter 144 produces AC power using the output power from the generator inverter 146 to draw power from the high speed permanent magnet turbogenerator 10. The controller 40 regulates fuel to the turbine 31 through fuel control valve 44.

The controller 40 is illustrated in more detail in FIG. 3 and generally comprises the insulated gate bipolar transistors (IGBT) gate drives 161, control logic 160, generator inverter 146, permanent magnet generator filter 180, DC bus capacitor 48, load inverter 144, AC filter 51, output contactor 52, and control power supply 182. The control logic 160 also provides power to the fuel cutoff solenoid 62, the fuel control valve 44 and the ignitor 60. The battery controller 71 connects directly to the DC bus 145'. The control logic 160 receives temperature signal 164, voltage signal 166, and current signal 184 while providing a relay drive signal 165.

Control and start power can come from either the external battery controller 71 for battery start applications or from the utility 41 which is connected to a rectifier using inrush limiting techniques to slowly charge the internal bus capacitor 48. For grid connect applications, the control logic 160 drives the solid state (IGBT) switches associated with the load inverter 144 to provide start power to the generator inverter 146. The IGBT switches are operated at a high frequency and modulated in a pulse width modulation manner to provide four quadrant inverter operation where the inverter 144 can either source power from the DC bus to the grid or source power from the grid to the DC bus. This control may be achieved by a current regulator. Optionally, two of the switches may serve to create an artificial neutral for stand-alone operations where start power from an external DC supply is applied directly to the DC bus.

The solid state (IGBT) switches associated with the generator inverter 146 output are also driven from the control logic 160, providing a variable voltage, variable frequency, three-phase drive to the generator motor 10 to start the turbine 31 of the power head 13. The controller 40 receives current feedback 184 via current sensors as the turbine generator is ramped up to speed to complete the start sequence. When the turbine 31 achieves self-sustaining speed, the generator inverter 146 changes its mode of operation to boost the generator output voltage and provide a regulated DC link voltage.

The generator filter 180 includes a plurality of inductors to remove the high frequency switching components from the permanent magnet generator power so as to increase operating efficiency. The AC filter 51 also includes a plurality of inductors plus capacitors to remove the high frequency switching components. The output contactor 52 disengages the load inverter 144 in the event of a unit fault.

The fuel solenoid 62 is a positive fuel cutoff device which the control logic 160 opens during the start sequence and maintains it open until the system is commanded off. The fuel control valve 44 is a variable flow valve providing a dynamic regulating range, allowing minimum fuel during start and maximum fuel at full load. A variety of fuel controllers, including liquid and gas fuel controllers may be utilized. The ignitor 60 would normally be a spark type device, similar to a spark plug for an internal combustion engine. It would, however, only be operated during the start sequence.

For stand-alone operation, the turbine is started using an external DC converter which boosts voltage from an external source such as a battery and connects directly to the DC bus. The load inverter 144 can then configured as a constant voltage, constant frequency source. The output is not limited to a constant voltage, constant frequency source, but rather may be a variable voltage, variable frequency source. For rapid increases in output power demand, the external DC converter supplies energy temporally to the DC bus and to the power output, the energy is then restored to the energy storage and discharge system 69 after a new operating point is achieved.

A functional block diagram of the interface between the alternate controller 40' and the permanent magnet turbogenerator/motor 10 for stand-alone operation is illustrated in FIG. 4. The generator controller 40' receives power 41 from a source such as a utility or battery system to operate the permanent magnet generator 12 as a motor to start rotation of compressor 30 and turbine 31 of the power head 13. During the start sequence, the utility power 41 if available, is rectified and a controlled frequency ramp is supplied to the permanent magnet generator 12 which accelerates the permanent magnet rotor 16 and the compressor wheel 32, bearing rotor 36 and turbine wheel 33. This acceleration provides an air cushion for the air bearings and airflow for the combustion process.

At about 12,000 rpm, spark and fuel are provided and the generator controller 40' assists acceleration of the turbogenerator 10 up to about 40,000 rpm to complete the start sequence. The fuel control valve 44 is also regulated by the generator controller 40'.

Once self sustained operation is achieved, the generator controller 40' is reconfigured to produce low frequency, variable voltage three-phase AC power (up to 250 VAC for 208 V systems, up to 550 VAC for 480 V systems) at the output AC bus 42 from the rectified high frequency AC output (280–380 volts for 208 V systems, 600–900 volts for 480 V systems) of the high speed permanent magnet turbogenerator 10 to start an induction motor or is set to produce a fixed frequency (60 hertz) constant voltage for stand alone operation. The permanent magnet turbogenerator 10 is commanded to a power set point with fuel flow, speed, and combustion temperature varying as a function of the desired output power.

The generator controller 40' also includes an energy storage and discharge system 69 having an ancillary electric storage device 70 which is connected through control electronics 71. This connection to the DC bus 145' is bi-directional in that electrical energy can flow from the ancillary electric storage device 70 to the generator controller 40', for example during turbogenerator/motor start-up, and electrical energy can also be supplied from the turbogenerator/motor controller 40' to the ancillary electric storage device or battery 70 during sustained operation.

An example of this alternate turbogenerator/motor control system is described in U.S. patent application Ser. No. 003,078, filed Jan. 5, 1998 by Everett R. Geis, Brian W. Peticolas, and Joel B. Wacknov entitled "Turbogenerator/Motor Controller with Ancillary Energy Storage/Discharge", assigned to the same assignee as this application and incorporated herein by reference.

The functional blocks internal to the generator controller 40' are illustrated in FIG. 5. The generator controller 40' includes in series the start power contactor 46, bridge rectifier 47, DC bus capacitors 48, pulse width modulated (PWM) inverter 49, AC output filter 51, output contactor 52, generator contactor 53, and permanent magnet generator 12. The generator rectifier 54 is connected from between the bridge rectifier 47 and bus capacitors 48 to between the generator contactor 53 and permanent magnet generator 12. The AC power output 42 is taken from the output contactor 52 while the neutral is taken from the AC filter 51.

The control logic section consists of control power supply 56, control logic 57, and solid state switched gate drives illustrated as integrated gate bipolar transistor (IGBT) gate drives 58, but may be drives for any high speed solid state switching device. The control logic 57 receives a temperature signal 64 and a current signal 65 while the IGBT gate drives 58 receive a voltage signal 66. The control logic 57 sends control signals to the fuel cutoff solenoid 62, the fuel control valve(s) 44 (which may be a number of electrically controlled valves), the ignitor 60 and compressor discharge air dump valve 61. AC power 41 is provided to both the start power contactor 46 and in some instances directly to the control power supply 56 in the control logic section of the generator controller 40' as shown in dashed lines.

The energy storage and discharge system 69 is connected to the controller 40' across the voltage bus $V_{bus}$ between the bridge rectifier 47 and DC bus capacitor 48 together with the generator rectifier 43. The energy storage and discharge system 69 includes an off-load device 73 and ancillary energy storage and discharge switching devices 77 both connected across voltage bus $V_{bus}$.

The off-load device 73 includes an off-load resistor 74 and an off-load switching device 75 in series across the voltage bus $V_{bus}$. The ancillary energy storage and discharge switching device 77 comprises a charge switching device 78 and a discharge switching device 79, also in series across the voltage bus $V_{bus}$. Each of the charge and discharge switching devices 78, 79 include a solid state switched gate drive 81, shown as an integrated gate bipolar transistor (IGBT) gate drive and an anti-parallel diode 82. Capacitor 84 and ancillary storage and discharge device 70, illustrated as a battery, are connected across the discharge switching device 79 with main power relay 85 between the capacitor 84 and the ancillary energy storage and discharge device 70. Inductor 83 is disposed between the charge switching device 78 and the capacitor 84. A precharge device 87, consisting of a precharge relay 88 and precharge resistor 89, is connected across the main power relay 85.

The PWM inverter 49 operates in two basic modes: a variable voltage (0–190 V line to line or 0–400 V for 480 V systems), variable frequency (0–700 hertz) constant volts per hertz, three-phase mode to drive the permanent magnet generator/motor 12 for start up or cool down when the generator contactor 53 is closed; or a constant voltage (120 V line to neutral per phase or 277 V line to neutral for 480 V systems), constant frequency three-phase 60 hertz mode. The control logic 57 and IGBT gate drives 58 receive feedback via current signal 65 and voltage signal 66, respectively, as the turbine generator is ramped up in speed to complete the start sequence. The PWM inverter 49 is then reconfigured to provide 60 hertz power, either as a current source for grid connect, or as a voltage source.

The PWM inverter 49 is truly a dual function inverter which is used both to start the permanent magnet turbogenerator/motor 10 and is also used to convert the permanent magnet turbogenerator/motor output to utility power, either sixty hertz, three-phase for stand alone applications, or as a current source device. With start power contactor 46 closed, single or three-phase utility power is brought through the start power contactor 46 to be able to operate into a bridge rectifier 47 and provide precharged power and then start voltage to the bus capacitors 48 associated with the PWM inverter 49. This allows the PWM inverter 49 to function as a conventional adjustable speed drive motor starter to ramp the permanent magnet turbogenerator/motor 10 up to a speed sufficient to start the gas turbine 31.

An additional rectifier 54, which operates from the output of the permanent magnet turbogenerator/motor 10, accepts the three-phase, up to 380 volt AC from the permanent magnet generator/motor 12 which at full speed is 1600 hertz and is classified as a fast recovery diode rectifier bridge. Six diode elements arranged in a classic bridge configuration comprise this high frequency rectifier 54 which provides output power at DC to power the inverter. Alternately, the rectifier 54 may be replaced with a high speed inverter permanently connected to the turbogenerator, eliminating the dual functionality of the inverter 49, and eliminating the need for certain contactors, such as generator contactor 53. The rectified voltage is as high as 550 volts under no load.

The off-load device 73, including off-load resistor 74 and off-load switching device 75 can absorb thermal energy from the turbogenerator 10 when the load terminals are disconnected, or there is a rapid reduction in load power demand. The off-load switching device 75 will turn on proportionally to the amount of off-load required and essentially will provide a load for the gas turbine 31 while the fuel is being cut back to stabilize operation at a reduce power level. The system serves as a dynamic brake with the resistor connected across the DC bus through an IGBT and serves as a load on the gas turbine during any overspeed condition.

In addition, the ancillary electric storage device 70 can continue motoring the turbogenerator 10 for a short time after a shutdown in order to cool down the turbogenerator 10 and prevent the soak back of heat from the recuperator 15. By continuing the rotation of the turbogenerator 10 for several minutes after shutdown, the power head 13 will keep moving air through the turbogenerator which will sweep heat away from the permanent magnet generator 12. This allows a gradual and controlled cool down of all of the turbine end components.

The battery switching devices 77 are a dual path since the ancillary electric storage device 70 is bi-directional. The ancillary electric storage device 70 can provide energy to the power inverter 49 when a sudden demand or load is required and the gas turbine 31 is not up to speed. At this point, the battery discharge switching device 79 turns on for a brief instant and draws current through the inductor 83. The battery discharge switching device 79 is then opened and the current path continues by flowing through the diode 82 of the battery charge switching device 78 and then in turn provides current into the inverter capacitor 48.

The battery discharge switching device 79 is operated at a varying duty cycle, high frequency, rate to control the amount of power and can also be used to initially ramp up the controller 40' for battery start operations. After the system is in a stabilized, self-sustaining condition, the battery charge switching device 78 is used exactly in the opposite. At this time, the battery charge switching device 78 periodically closes in a high frequency modulated fashion to force current through inductor 83 and into capacitor 84 and then directly into the ancillary electric storage device 70.

The capacitor 84, connected to the ancillary electric storage device 70 via the precharge relay 88 and resistor 89 and the main power relay 85, is provided to isolate the ancillary electric storage device 70 when it is in an off-state. The normal, operating sequence is that the precharge relay 88 is momentarily closed to allow charging of all of the capacitive devices in the entire system and the main power relay 85 is closed to directly connect the ancillary.

FIG. 6 is a functional block diagram of the permanent magnet turbogenerator/motor synchronous condenser control system of the present invention. It illustrates the present invention as applied to a single turbogenerator set 245 shown in the phantom box in FIG. 6. The turbogenerator set 245 generally comprises what is illustrated in the functional block diagram of FIG. 2.

The gaseous fuel line 243 delivers a gaseous fuel, such as natural gas or the like, to the gaseous fuel cutoff solenoid 62. The pressure of the gaseous fuel supplied to the power head 13 may be controlled by a gaseous fuel compressor 246, such as a helical flow compressor in a system as generally described in U.S. patent application Ser. No. 730,945, filed Oct. 16, 1996 by Robert W. Bosley, Edward C. Edelman, and Ronald F. Miller entitled "Gaseous Fuel Compression and Control System and Method", now U.S. Pat. No. 5,819,524 issued Oct. 31, 1998, assigned to the same assignee as this application and incorporated herein by reference. Alternately, the gaseous fuel may be supplied by a proportional pressure regulating valve if the gaseous fuel supply pressure is greater than that required by the power head.

A generator converter 248 controls the permanent magnet generator/motor 12 while the compressor converter 250 controls the gaseous fuel compressor 246. A generator breaker 252 is provided between the output AC bus 254 and the generator converter 248 and compressor converter 250. Synchronous condenser 260 is connected to the output AC bus 254 through condenser breaker 262. A line commutated inverter 264 powered by a DC energy storage device such as battery 266 powers the synchronous condenser 260, a wound field rotating device capable of supplying very high currents relative to its physical size. Both the line commutated inverter 264 and the synchronous condenser 260 receive signals from the generator converter 248 which also supplies signals to the solid state switch 268 connected to the system bus 254 through solid state switch breaker 270. The solid state switch 268 connects to resistive load 272.

While FIG. 6 illustrates a single turbogenerator set 245 in a standalone operation, it could be mechanized with a plurality of paralleled turbogenerators for greater power. In contrast, FIG. 7 illustrates a turbogenerator set 245' including a plurality of paralleled turbogenerators in utility grid connection operation. The utility grid connection generator set 245' is shown by of example with three (3) permanent magnet generator/motors 12 and (3) three power heads 13 plus three sets of associated electrical apparatus. Each of the generator converters 248 are connected to a master controller 276 which in turn is connected to a metering and protection control 278.

The facility switchgear 280 includes, in series, utility meter 282, main breaker 284, fast disconnect switch 286, control meter 288, and feeder breaker 295. Load breakers 290, 292, and 294 are individually connected between the control meter 288 and feeder breaker 295. The feeder breaker 295 connects to the system bus 254 while the control meter 288 and metering and protection control 278 are electrically connected.

The utility transformer 296 is connected to the utility meter 282. Load breakers 290, 292 and 294 control electrical feeds to a first load 297, a second load 298, and a third load 299, respectively. Additional load breakers can be provided for any additional loads as required.

Regardless of the number of turbogenerator sets, shown for purposes of illustration only as three (although it could be even one or a higher number), a single synchronous condenser 260, line commutated inverter 264 and battery 266 connected to the system bus 254 is all that is required. Likewise, a single resistive load 272 connected to the system bus 254 through solid state switch breaker 270 is required.

The synchronous condenser 260 is essentially a wound field synchronous rotating machine, but typically is constructed without an output shaft. It can be over or under excited, usually with a "brush-less synchronous revolving field" exciter, to provide leading or lagging power factor control. It can be wound as a very low impedance machine (x' less than 4%), being capable of supplying up to 25 times its full load rating for instantaneous fault current for branch circuit breaker and fuse clearing. It can also provide for harmonic cancellation of high harmonic content current sources. It would be mechanized with multiple windings allowing for "series-parallel" start/run, therefore within the range of the turbine generator converter. The synchronous condenser 260 can provide high peak currents associated with motor starting and transformer in-rush.

The line-commutated inverter 264, essentially a "phase controlled" fourth quadrant mode, provides a power path for the DC energy storage source 266 to the AC line. It must have an AC source of excitation with the synchronous condenser 260 serves both as the excitation source and smoothing filter. A six pulse structure, or possible a twelve or eighteen pulse structure would be required to maintain harmonics at acceptable levels during boost mode. The line-commutated inverter 264 would draw power from the DC energy storage source 266 for up to forty-five (45) seconds during turbine on-loading. The line commutated inverter 264 can also provide power peaks for such events as compressor motor starting and similar events.

The fast disconnect switch 286 is essentially an "antiparallel" Silicon Controlled Rectifier (SCR) pair provided per phase and capable of disconnecting the utility in less than ½ cycle upon sensing loss of grid by a combination of voltage erosion and instantaneous reverse power. The fast disconnect switch 286 prevents the turbine system from attempting to power grid connected equipment outside the perimeter of the "protected" distribution and provides the basis for "uninteruptible" power.

The solid state switch 268 and resistive load 272 are similar in construction to the fast disconnect switch 286 except that they do not require voltage sensing or reverse power computation capability. They can provide an "offload" path for the turbine system if the facility load demand is suddenly reduced. They prevent reverse power flow into the utility, dissipate turbine power from the turbine converters until fuel flow is reduced and recuperator heat is dissipated.

The resistive load 272 can absorb thermal energy from the turbogenerator 10 when the load terminals are disconnected, either inadvertently or as the result of a rapid change in load. The solid state switch 270 will turn on proportionally to the amount of off-load required and essentially will provide a load for the gas turbine 31 of power head 13 while the fuel is being cut back to stabilize operation at a reduce level. The system serves as a dynamic brake with the resistor connected across the DC and serves as a load on the gas turbine during any overspeed condition.

The synchronous condenser system of the present invention stabilizes multiple paralleled electronic power converters powered by turbine generator/motors and allow continued and uninterrupted power after separation from the utility grid. It will provide fault current far in excess of a single, or combination of, semiconductor based converters and provide motor starting and transformer in-rush capability greater than comparable sized conventional generator sets. It also has the capability to support on-load rates of one thousand (1,000) kW per second per paralleled turbine, even with the turbines operating at minimum speed. It further enables a grid-connected group of turbines to separate from the grid and support a building, or other connected load, with power quality in accordance with the CBEMA power quality curve (1978 draft). The system provides off-load rates of one thousand (1,000) kW per second per paralleled turbine, even with the turbines operating at maximum speed and turbine exhaust gas temperature.

Instead of supplementing the output capability or transient on-load capability of the turbogenerator at the DC end where the inverter has to carry the full load to the utility or load, the synchronous condenser 260 is capable of supplying very high currents relative to its size. When it comes up to speed, the synchronous condenser 260 is an extremely low impedance source capable of providing relatively high fault currents which is particularly important in stand-alone parallel applications. In addition, the synchronous condenser 260 has excellent filtering capabilities so that it can utilize a separate line commutated inverter 264 which can interface with an energy storage device such as a battery 266 to provide instantaneous power while the turbines are coming to full speed and power. Thus, the synchronous condenser 260 buffers the high current distortion from the utility grid. This is opposed to a SCR type inverter whose output voltage distortion is extremely high such that it is not normally utilized as a utility interface.

The synchronous condenser 260 is illustrated in both a single turbogenerator set application and a multiple turbogenerator set configuration. Multiple turbogenerator set configurations made the system even more economically viable. It is capable of operating not only in a stand-alone mode but can also provide very high starting currents for large air conditioner compressor motors and the like.

While specific embodiments of the invention have been illustrated and described, it is to be understood that these are provided by way of example only and that the invention is not to be construed as being limited thereto but only by the proper scope of the following claims.

What I claim is:

1. A method of controlling a permanent magnet turbogenerator/motor having an output AC bus, comprising the steps of:
    connecting a synchronous condenser to the output AC bus of the permanent magnet turbogenerator/motor;
    powering the synchronous condenser with a line commutated inverter wherein the inverter is commutated by the synchronous condenser; and
    meeting transient power requirements of the permanent magnet turbogenerator/motor with power from the synchronous condenser until the permanent magnet turbogenerator/motor powers up to the increased power requirements.

2. The method of controlling a permanent magnet turbogenerator/motor of claim 1 and in addition the steps of:

connecting a resistive load to the output AC bus; and dissipating excess transient power from the permanent magnet turbogenerator/motor in the resistive load.

3. A method of controlling a plurality of paralleled permanent magnet turbogenerator/motors having an output AC bus, comprising the steps of:

connecting a synchronous condenser to the output AC bus of the plurality of permanent magnet turbogenerator/motors;

powering the synchronous condenser with a line commutated inverter wherein the line commutated inverter is commutated by the synchronous condenser;

connecting a resistive load to the output AC bus;

meeting transient power requirements of the plurality of permanent magnet turbogenerator/motors with power from the synchronous condenser until the permanent magnet turbogenerator/motors powers up to the increased power requirements; and dissipating excess transient power from the plurality of permanent magnet turbogenerator/motors in the resistive load.

4. A permanent magnet turbogenerator/motor control, comprising:

a permanent magnet turbogenerator/motor having an output AC bus;

a synchronous condenser operably connected to said output AC bus of said permanent magnet turbogenerator/motor;

a line commutated inverter operably connected to said synchronous condenser to power said synchronous condenser, said inverter commutated by said synchronous condenser; and a controller operably associated with said permanent magnet turbogenerator/motor and said synchronous condenser to provide transient power from said synchronous condenser until the permanent magnet turbogenerator/motor powers up to the increased power requirements.

5. The permanent magnet turbogenerator/motor control of claim 4 and in addition, a resistive load operably connected to said output AC bus and to said controller, and wherein said controller directs said resistive load to dissipate excess transient power from the permanent magnet turbogenerator/motor.

6. A permanent magnet turbogenerator/motor control, comprising:

a permanent magnet turbogenerator/motor having a permanent magnet generator/motor, an air compressor, a gas turbine, a combustor, a gaseous fuel compressor, an internal DC system bus, and an output AC bus;

a generator converter operably connected to said permanent magnet generator/motor and said internal DC system bus of said permanent magnet turbogenerator/motor;

a gaseous fuel compressor converter operably connected to said permanent magnet generator/motor gaseous fuel compressor, said generator converter, and said internal DC system bus of said permanent magnet turbogenerator/motor;

a synchronous condenser operably connected to said output AC bus of said permanent magnet turbogenerator/motor;

a line commutated inverter operably connected to said synchronous condenser to power said synchronous condenser; and a resistive load operably connected to said output AC bus;

said generator converter providing signals to said synchronous condenser and said line commutated inverter to direct said synchronous condenser to provide transient power when required, to said resistive load to dissipate excess transient power from said permanent magnet turbogenerator/motor, and to said gaseous fuel compressor converter to regulate gaseous fuel flow through said gaseous fuel compressor.

7. A permanent magnet turbogenerator/motor control, comprising:

at least one permanent magnet turbogenerator/motor having a permanent magnet generator/motor, an air compressor, a gas turbine, a combustor, a gaseous fuel compressor, an internal DC system bus, and an output AC bus;

a generator converter operably connected to each of said at least one permanent magnet generator/motor and said internal DC system bus of said at least one permanent magnet turbogenerator/motor;

a gaseous fuel compressor converter operably connected to each of said at least one permanent magnet generator/motor gaseous fuel compressor, said generator converter, and said internal DC system bus of said at least one permanent magnet turbogenerator/motor;

a synchronous condenser operably connected to said output AC bus of said permanent magnet turbogenerator/motor;

a line commutated inverter operably connected to said synchronous condenser to power said synchronous condenser; and a resistive load operably connected to said output AC bus;

said generator converter providing signals to said synchronous condenser and said line commutated inverter to direct said synchronous condenser to provide transient power when required, to said resistive load to dissipate excess transient power from said at least one permanent magnet turbogenerator/motor, and to said gaseous fuel compressor converter to regulate gaseous fuel flow through said gaseous fuel compressor.

8. A permanent magnet turbogenerator/motor control, comprising:

a plurality of permanent magnet turbogenerator/motors each having a permanent magnet generator/motor, an air compressor, a gas turbine, a combustor, a gaseous fuel compressor, and an internal DC system bus, and said plurality also including an output AC bus;

a like plurality of generator converters with a generator converter operably connected to one of said plurality of permanent magnet generator/motors and said internal DC system bus of each of said plurality of permanent magnet turbogenerator/motors;

a like plurality of gaseous fuel compressor converters with a gaseous fuel compressor converter operably connected to one of said gaseous fuel compressors, said generator converters, and said internal DC system bus of each of said permanent magnet turbogenerator/motors;

a synchronous condenser operably connected to said output AC bus of said permanent magnet turbogenerator/motors;

a line commutated inverter operably connected to said synchronous condenser to power said synchronous condenser; and a resistive load operably connected to said output AC bus;

said plurality of generator converters providing signals to said synchronous condenser and said line commutated inverter to direct said synchronous condenser to provide transient power when required, to said resistive load to dissipate excess transient power from said plurality of permanent magnet turbogenerator/motors, and to said gaseous fuel compressor converters to regulate gaseous fuel flow through said gaseous fuel compressors.

9. The permanent magnet turbogenerator/motor control of claim 8 and in addition, a fast acting solid state switch operably associated with said output AC bus to disconnect said output AC bus from the utility grid allowing uninterrupted and sustained system operation in the event of an utility outage or extreme fluctuation.

10. The permanent magnet turbogenerator/motor control of claim 8 and in addition, a master controller operably connected to each of said plurality of generator converters to coordinate the operation of said plurality converters.

11. The permanent magnet turbogenerator/motor control of claim 10 and in addition, facility switchgear operably connected to the output AC bus and to said master controller.

12. The permanent magnet turbogenerator/motor control of claim 11 and in addition, a metering and protection control operably disposed between said facility switchgear and said master controller.

13. The permanent magnet turbogenerator/motor control of claim 11 wherein said facility switchgear includes, in series, a utility meter, a main breaker, a fast disconnect switch, a control meter to which said master controller is operably connected, and a feeder breaker operably connected to said output AC bus, and also a plurality of load breakers.

14. A method of controlling a permanent magnet turbogenerator/motor having an output AC bus, comprising:

electrically connecting a synchronous condenser to the output AC bus of the permanent magnet turbogenerator/motor;

powering the synchronous condenser with a line commutated inverter with the inverter commutated by the synchronous condenser; and meeting transient electrical power requirements of the permanent magnet turbogenerator/motor with non-reactive electrical power from the line commutated inverter commutated by the synchronous condenser until the permanent magnet turbogenerator/motor powers up to the increased power requirements.

15. The method of controlling a permanent magnet turbogenerator/motor of claim 14 and in addition:

electrically connecting a resistive load to the output AC bus; and dissipating excess transient power from the permanent magnet turbogenerator/motor in the resistive load.

16. A method of controlling a plurality of paralleled permanent magnet turbogenerator/motors having an output AC bus, comprising:

electrically connecting a synchronous condenser to the output AC bus of the plurality of permanent magnet turbogenerator/motors;

powering the synchronous condenser with a line commutated inverter with the line commutated inverter commutated by the synchronous condenser;

connecting a resistive load to the output AC bus;

meeting transient electrical power requirements of the plurality of permanent magnet turbogenerator/motors with non-reactive electrical power from the line commutated inverter commutated by the synchronous condenser until the plurality of permanent magnet turbogenerator/motors powers up to the increased power requirements; and dissipating excess transient power from the plurality of permanent magnet turbogenerator/motors in the resistive load.

17. A permanent magnet turbogenerator/motor control, comprising:

a permanent magnet turbogenerator/motor having an output AC bus;

a synchronous condenser electrically connected to said output AC bus of said permanent magnet turbogenerator/motor;

a line commutated inverter electrically connected to said synchronous condenser to power said synchronous condenser, said inverter commutated by said synchronous condenser; and a controller operably associated with said permanent magnet turbogenerator/motor and said synchronous condenser to provide transient non-reactive electrical power from said line commutated inverter commutated by said synchronous condenser until the permanent magnet turbogenerator/motor powers up to the increased power requirements.

18. The permanent magnet turbogenerator/motor control of claim 17 and in addition, a resistive load operably connected to said output AC bus and to said controller, and wherein said controller directs said resistive load to dissipate excess transient power from the permanent magnet turbogenerator/motor.

19. A method of controlling a permanent magnet turbogenerator/motor having a permanent magnet generator/motor, an air compressor, a gas turbine, a combustor, a gaseous fuel compressor, an internal DC system bus, and an output AC bus, comprising:

operably connecting a generator converter to the permanent magnet generator/motor and the internal DC system bus of the permanent magnet turbogenerator/motor;

operably connecting a gaseous fuel compressor converter to the permanent magnet generator/motor gaseous fuel compressor, the generator converter, and the internal DC system bus of the permanent magnet turbogenerator/motor;

connecting a synchronous condenser to the output AC bus of the permanent magnet turbogenerator/motor;

powering the synchronous condenser with a line commutated inverter which is commutated by the synchronous condenser;

connecting a resistive load to the output AC bus;

providing signals from the generator converter to the synchronous condenser and the line commutated inverter to direct the synchronous condenser to provide transient power when required, to the resistive load to dissipate excess transient power from the permanent magnet turbogenerator/motor, and to the gaseous fuel compressor converter to regulate gaseous fuel flow through the gaseous fuel compressor.

20. A method of controlling a permanent magnet turbogenerator/motor having a permanent magnet generator/ motor, an air compressor, a gas turbine, a combustor, a gaseous fuel compressor, an internal DC system bus, and an output AC bus, comprising:

provid ing a generator converter for the permanent magnet generator/motor and the internal DC system bus of the permanent magnet turbogenerator/motor;

providing a gaseous fuel compressor converter for the permanent magnet generator/motor gaseous fuel compressor, the generator converter, and the internal DC system bus of the permanent magnet turbogenerator/motor;

electrically connecting a synchronous condenser to the output AC bus of the permanent magnet turbogenerator/motor;

powering the synchronous condenser with a line commutated inverter which is commutated by the synchronous condenser;

providing a resistive load for the output AC bus;

providing signals from the generator converter to the synchronous condenser and the line commutated inverter to direct the synchronous condenser to provide transient power when required, to the resistive load to dissipate excess transient power from the permanent magnet turbogenerator/motor, and to the gaseous fuel compressor converter to regulate gaseous fuel flow through the gaseous fuel compressor.

* * * * *

UNITED STATES PATENT AND TRADEMARK OFFICE
CERTIFICATE OF CORRECTION

PATENT NO. : 6,093,975
DATED     : July, 25, 2000
INVENTOR(S) : Brian W. Peticolas It is certified that error appears in the above-identified patent and that said Letters Patent is hereby corrected as shown below:

Column 8, line 29, change "Oct. 31, 1998" to --Oct. 13, 1998--
Column 9, line 32, before "fourth" insert -- rectifier operating in--

Signed and Sealed this

Twenty-ninth Day of May, 2001

Attest:

NICHOLAS P. GODICI

Attesting Officer     Acting Director of the United States Patent and Trademark Office